United States Patent
Jeong et al.

(10) Patent No.: US 12,113,207 B2
(45) Date of Patent: Oct. 8, 2024

(54) CONGLOMERATION GRAPHITE, SECONDARY BATTERY INCLUDING SAME AS ANODE ACTIVE MATERIAL, AND METHOD FOR PRODUCING CONGLOMERATION GRAPHITE

(71) Applicants: LPN CO., LTD, Hwaseong-si (KR); Young Woon Jeong, Pyeongtaek-si (KR)

(72) Inventors: Young Woon Jeong, Pyeongtaek-si (KR); Jeong Hun Oh, Hwaseong-si (KR); Hwan Jin Kim, Yongin-si (KR)

(73) Assignees: LPN CO., LTD., Hwaesong-si (KR); Young Woon Jeong, PYeongtaek-si (KR)

( * ) Notice: Subject to any disclaimer, the term of this patent is extended or adjusted under 35 U.S.C. 154(b) by 0 days.

(21) Appl. No.: 18/569,207

(22) PCT Filed: Oct. 13, 2021

(86) PCT No.: PCT/KR2021/014070
§ 371 (c)(1),
(2) Date: Dec. 11, 2023

(87) PCT Pub. No.: WO2023/008646
PCT Pub. Date: Feb. 2, 2023

(65) Prior Publication Data
US 2024/0266503 A1    Aug. 8, 2024

(30) Foreign Application Priority Data
Jul. 29, 2021    (KR) ........................ 10-2021-0099774

(51) Int. Cl.
H01M 4/36      (2006.01)
H01M 4/02      (2006.01)
H01M 4/587     (2010.01)

(52) U.S. Cl.
CPC ........... *H01M 4/364* (2013.01); *H01M 4/366* (2013.01); *H01M 4/587* (2013.01); *H01M 2004/021* (2013.01); *H01M 2004/027* (2013.01)

(58) Field of Classification Search
CPC ...... H01M 4/364; H01M 4/366; H01M 4/587; H01M 4/583; H01M 4/393; H01M 4/625;
(Continued)

(56) References Cited

U.S. PATENT DOCUMENTS 6,632,569 B1 * 10/2003 Kameda ............ H01M 10/0525
                                                      252/502
2004/0224230 A1 * 11/2004 Yanagida ............... H01M 4/133
                                                      429/330

(Continued)

FOREIGN PATENT DOCUMENTS

JP      2004-210634 A    7/2004
JP      7315800 B2       7/2023
(Continued)

OTHER PUBLICATIONS

Japanese Office Action mailed on May 24, 2024.

*Primary Examiner* — Helen Oi K Conley
*Assistant Examiner* — Amanda Rosenbaum
(74) *Attorney, Agent, or Firm* — You & IP, LLC (57) ABSTRACT

Disclosed is a method for preparing a novel granulated spherical graphite and, specifically, to a method for preparing a novel granulated spherical graphite, the method allowing a composite spherical graphite to be prepared from natural graphite discarded in a mechanical process, during the preparation of a spherical graphite having a diameter of tens of micrometers and mechanically obtained from scale-like natural graphite.

20 Claims, 3 Drawing Sheets

(58) Field of Classification Search
CPC ......... H01M 4/9083; H01M 2004/021; H01M 2004/027
See application file for complete search history.

(56) References Cited

U.S. PATENT DOCUMENTS

| | | | | |
|---|---|---|---|---|
| 2009/0311599 | A1* | 12/2009 | Kawai | H01M 4/133 29/623.5 |
| 2022/0285686 | A1* | 9/2022 | Kim | C01B 32/05 |
| 2023/0192498 | A1* | 6/2023 | Jeong | C01B 32/21 252/182.1 |

FOREIGN PATENT DOCUMENTS

| | | |
|---|---|---|
| KR | 10-2003-0087986 A | 11/2003 |
| KR | 10-2005-0084413 A | 8/2005 |
| KR | 10-0732458 B1 | 6/2007 |
| KR | 10-2014-0085767 A | 7/2014 |
| KR | 10-2017-0046114 A | 4/2017 |
| KR | 10-2018-0078044 A | 7/2018 |
| KR | 10-2020-0072862 A | 6/2020 |
| KR | 10-2021-0040810 A | 4/2021 |
| KR | 10-2254549 B1 | 5/2021 |
| WO | 2020149685 A1 | 7/2020 |

* cited by examiner

CONGLOMERATION GRAPHITE, SECONDARY BATTERY INCLUDING SAME AS ANODE ACTIVE MATERIAL, AND METHOD FOR PRODUCING CONGLOMERATION GRAPHITE

TECHNICAL FIELD

The present invention relates to novel conglomeration graphite, a battery including the same as an anode active material, and a method for preparing the conglomeration graphite. Particularly, the present invention relates to conglomeration graphite having a particle size of several μm produced from flaky natural graphite and pitch, which is amorphous carbon, through a spheroidization process, a battery using the conglomeration graphite as an anode active material, and a method for producing the conglomeration graphite.

BACKGROUND ART

With the recent growths of notebook-type personal computers, and portable devices such as mobile phones based on 5G communication, the demand for batteries is rapidly increasing, and the uses of batteries are also expanding. A battery required in response to such a situation is a lithium ion secondary battery that satisfies the miniaturization and weight reduction of the battery. For the high performance of the lithium secondary battery, a carbonaceous material such as graphite is used as an anode active material of the battery.

Graphite of carbonaceous material used as the anode active material for the secondary battery should be used in a spherical form for the charge/discharge efficiency of the battery, and more preferably, it should be used in a crystalline spherical form. Various methods for producing spherical graphite used as the anode active material for the secondary battery are known.

On the other hand, in general, the higher the crystallinity of graphite, the more regular the crystallinity grows and flaky. Accordingly, as one method for obtaining crystalline spherical graphite desirable as the anode active material for the secondary battery, a method for processing flaky natural graphite collected from natural resources into a spherical shape through mechanical process such as crushing, refining, pulverization, and sorting is used. However, the yield of the method for obtaining crystalline spheroidal graphite from flaky natural graphite by the mechanical process is about 30% or less, and the remaining 70% or more is discarded in the mechanical process.

The flaky natural graphite can be purchased inexpensively, but the production efficiency of crystalline spheroidal graphite from flaky natural graphite is as low as about 30% as described above. As a result, it is expensive to produce crystalline spheroidal graphite.

Therefore, it is necessary to develop a new method for producing conglomeration graphite, which is capable of increasing the utility of discarded flaky natural graphite and allowing mass production with high efficiency and relatively easy to manufacture.

SUMMARY OF INVENTION

Technical Problem

The present invention is intended to provide a method for producing conglomeration graphite for an anode active material by using discarded natural graphite, which is high-efficiency, low-cost, easy to manufacture, and capable of mass production.

In addition, an object of the present invention is to provide a method for producing conglomeration graphite for an anode active material having excellent initial discharge capacity and initial efficiency of a battery, and the conglomeration graphite obtained by this method.

Another object of the present invention is to provide a method for producing conglomeration graphite having excellent crystalline quality, and the conglomeration graphite obtained by this method.

Yet another object of the present invention is to provide a method for producing conglomeration graphite having a uniform particle size with a specific surface area of 4.5 m$^2$/g or less of crystalline particles after crystallization of conglomeration graphite and having excellent crystallinity with d002 (nm, graphite interlayer distance) of 0.338 or less representing the degree of crystallinity of conglomeration graphite particles after crystallization, and the conglomeration graphite obtained by this method.

Solution to Problem

In order to accomplish the above objects, a method for producing novel conglomeration graphite of the present invention includes steps of:
(a) pulverizing flaky natural graphite and pitch, respectively ('natural graphite and pitch pulverization step');
(b) mixing the natural graphite and the pitch respectively pulverized at the step (a) ('natural graphite and pitch mixing step');
(c) further mixing a mixture of the step (b) with a solvent ('solvent mixing step');
(d) preparing a conglomerated first graphite composite by conglomerating the mixture of the step (c) ('conglomeration step');
(e) adding and mixing-coating additional pitch to the first graphite composite in which conglomeration of the step (d) is completed ('additional pitch adding and mixing-coating step');
(f) preparing a second composite in which the additional pitch is coated on an outside of the conglomerated first graphite composite by completing additional mixing of the mixture of the step (e) ('additional mixing completion step');
(g) performing a first heat treatment on the second composite of the step (f) ('first heat treatment step'); and
(h) after the first heat treatment of the step (g), cooling to room temperature and then performing a second heat treatment.

The conglomeration graphite produced by the above method of the present invention including the steps (a) to (h) may be used to manufacture an anode active material of a secondary battery.

Advantageous Effects

The method for producing novel conglomeration graphite according to the present invention has advantages of mass production because of low cost, high efficiency, and ease of manufacture.

In addition, the novel conglomeration graphite producing method according to the present invention can produce conglomeration graphite that can be used as an anode active material having excellent crystallinity and a constant particle size. Because of these characteristics, when the conglomeration graphite prepared according to the producing method of the present invention is used as an anode active material of a battery, there are advantages in that the initial discharge capacity and the initial efficiency of the battery are excellent.

DESCRIPTION OF BEST MODE

In the following, only parts necessary for understanding embodiments of the present invention will be described, and descriptions of other parts will be omitted in the scope not disturbing the subject matter of the present invention.

The terms and words used herein should not be construed as limited to ordinary or dictionary definition, and should be construed in light of the meanings and concepts consistent with the subject matter of the present invention on the basis of the principle that the inventor can properly define his own invention as the concept of the term to describe it in the best way. It is therefore to be understood that embodiments disclosed herein are merely exemplary and various equivalents or modifications thereof are possible.

The present invention provides a method for producing conglomeration graphite that can be mass-produced at low cost with high efficiency, has excellent crystal quality, and has a uniform particle size.

The method for producing conglomeration graphite according to an embodiment of the present invention includes steps of:
(a) pulverizing flaky natural graphite and pitch, respectively ('natural graphite and pitch pulverization step');
(b) mixing the natural graphite and the pitch respectively pulverized at the step (a) ('natural graphite and pitch mixing step');
(c) further mixing a mixture of the step (b) with a solvent ('solvent mixing step');
(d) preparing a conglomerated first graphite composite by conglomerating the mixture of the step (c) ('conglomeration step');
(e) adding and mixing-coating additional pitch to the first graphite composite in which conglomeration of the step (d) is completed ('additional pitch adding and mixing-coating step');
(f) preparing a second composite in which the additional pitch is coated on an outside of the conglomerated first graphite composite by completing additional mixing of the mixture of the step (e) ('additional mixing completion step');
(g) performing a first heat treatment on the second composite of the step (f) ('first heat treatment step'); and
(h) after the first heat treatment of the step (g), cooling to room temperature and then performing a second heat treatment.

Hereinafter, the steps (a) to (h) will be described in detail.

In the method for producing conglomeration graphite according to the present invention, the 'flaky natural graphite' of the step (a) may have an average particle diameter of 5 to 500 μm, preferably 5 to 100 μm, and when the average particle diameter exceeds 500 μm, it is not economically desirable because the overall production time increases.

In the method for producing conglomeration graphite according to the present invention, the pulverization of natural graphite at the step (a) is performed using a high-speed mechanical milling machine such as a hammer mill, a jet mill, a bead mill, or a combination thereof, preferably using the jet mill. In this case, a working pressure of the hammer mill, the jet mill, or the bead mill is a pressure required for each mill, and a pressure in case of pulverization using the jet mill is 5 bar to 10 bar, preferably 7 bar to 10 bar.

In addition, natural graphite particles are prepared to have an average particle diameter of 1 μm to 10 μm, preferably 1 μm to 5 μm through the pulverization process using the jet mill or the like from the flaky natural graphite as described above. The prepared natural graphite particles having an average particle diameter of 1 μm to 10 μm are referred to as 'pulverized natural graphite'.

Meanwhile, the pitch at the step (a) is petroleum-based pitch, coal-based pitch, or polymer resin, preferably petroleum-based pitch.

The pulverization of the pitch is performed using a high-speed mechanical milling machine such as a hammer mill, a jet mill, a bead mill, or a combination thereof, preferably using the jet mill. In this case, a working pressure of the hammer mill, the jet mill, or the bead mill is a pressure required for each mill, and a pressure in case of pulverization using the jet mill is 5 bar to 10 bar, preferably 6 bar to 10 bar.

In addition, pitch particles are prepared to have an average particle diameter of 0.5 μm to 10 μm, preferably 0.5 μm to 5 μm through the pulverization process using the jet mill or the like from the pitch as described above. The prepared pitch particles having an average particle diameter of 0.5 μm to 10 μm are referred to as 'pulverized pitch'.

In the method for producing conglomeration graphite according to the present invention, at the 'natural graphite and pitch mixing step' of step (b), the mixing weight % ratio between the 'pulverized natural graphite' and the 'pulverized pitch' is 99:1 to 50:50, preferably 99:1 to 70:30. If it is out of the above range, crystallization of the finished conglomeration graphite is lowered, and thus it may cause a disadvantage in that a manufacturing process of an anode active material becomes unstable because conglomeration graphite particles are broken in a process such as pressurization during the process of manufacturing the anode active material.

At the mixing step, a mixing time is the time until the mixing of the 'pulverized natural graphite' and the 'pulverized pitch' is completely achieved, and may be determined depending on the amount used. A preferred mixing time is 1 hour or more.

The 'solvent mixing step' of step (c) is a step of adding a solvent to the mixture of the 'pulverized natural graphite' and the 'pulverized pitch' of the step (b) and mixing again.

The solvent may be any solvent capable of dissolving the pitch, preferably one or more selected from the group consisting of mineral oil such as kerosene, heavy oil, light oil, and paraffin oil; hydrocarbon solvent such as toluene and decane; and mixtures thereof, and more preferably coal-based oil such as kerosene, light oil, heavy oil, and paraffin oil.

The amount of solvent used at the 'solvent mixing step' of step (c) is 10 to 50 parts by weight based on 100 parts by weight of the 'mixture of pulverized natural graphite and pulverized pitch', preferably 20 to 40 parts by weight, and more preferably 20 to 30 parts by weight.

If the amount of the solvent used is less than 10 parts by weight, mixing of the pulverized natural graphite and the pulverized pitch is poor and thus the spheroidization is not made in part. Therefore, the pulverized natural graphite that is not granulated may increase, so that the production efficiency of the conglomeration graphite will decrease. In addition, if the amount of liquid pitch used is greater than 50 parts by weight, the average particle diameter of the produced conglomeration graphite becomes large. Thus, a problem may occur in the production yield of the conglomeration graphite particles having an appropriate particle diameter that can be used as an anode active material for secondary batteries.

The mixing at the step (c) is performed using a mixer such as a screw mixer, and the mixing time is the time until the mixture of 'pulverized natural graphite and pulverized pitch' is completely mixed in the solvent, and may be determined depending on the amount used. A preferred mixing time is 1 hour or more.

In the method for producing conglomeration graphite according to the present invention, the 'conglomeration step' of step (d) is a step of preparing the 'first composite by pulverized natural graphite and pulverized pitch', which is the first graphite composite conglomerated using a conglomerating machine from the mixture of the step (c).

The conglomerating machine is a rotatable machine well known in the art and is preferably a machine in which a blade is formed on a rotor to apply friction and shear stress to the reduced pressure-treated mixture during rotation. It seems that the spheroidization of the pulverized graphite is caused by the friction and shear stress applied to the reduced pressure-treated mixture.

The conglomerating machine operates at a rotational force of more than 4,000 m/min up to 8,000 m/min, preferably at a rotational force of 4,500 m/min to 6,000 m/min. In addition, the operating time at the above rotational force is 100 seconds to 600 seconds, preferably 150 seconds to 400 seconds. If the rotational force is less than the above range, a lot of fine particles are generated during the production of the 'first composite by pulverized natural graphite and pulverized pitch', so that the specific surface area of total particles of finally prepared conglomeration graphite increases (see the second comparative example). In addition, even if the rotational force exceeds the above range, it may be difficult to finally produce the conglomeration graphite having a specific surface area of an appropriate level. Thus, the production efficiency of the conglomeration graphite for an anode active material of a secondary battery, which can exhibit an excellent effect in initial discharge capacity or the like, may be lowered.

In addition, if the conglomeration time is less than the above operating time range, the conglomeration efficiency of graphite may be lowered. Also, if the conglomeration time is greater than the above operating time range, the conglomerated graphite particles become larger, and thus it may be difficult to produce the conglomeration graphite for an anode active material of a secondary battery, which can exhibit an excellent effect in initial discharge capacity or the like.

In the method for producing conglomeration graphite according to the present invention, the 'additional pitch adding and mixing-coating step' of step (e) is a step of adding, mixing, and coating additional pulverized pitch to the outside of the first graphite composite conglomerated by the conglomeration step of step (d), that is, to the outside of the 'first composite by pulverized natural graphite and pulverized pitch'.

The amount of the additional pulverized pitch is an amount corresponding to the ratio of the total pitch (i.e., the sum of the pulverized pitch and the additional pulverized pitch) exceeding 25% by weight out of the total weight part of the sum of the pulverized natural graphite and pulverized pitch of the step (a) and the additional pulverized pitch. Preferably it is greater than 25% by weight to 60% by weight. If the additional pitch is added in an amount of 25% by weight or less, the amount of pitch involved in bonding of the pulverized natural graphite becomes insufficient. Thus, the crystallization of the conglomerated first graphite composite, that is, the 'first composite by pulverized natural graphite and pulverized pitch' is not sufficiently performed, so that the particle hardness of the conglomeration graphite after completely produced may be weakened (see the third comparative example).

Such conglomeration graphite having weak particle hardness can be easily broken under conditions such as pressurization when manufactured as an anode active material, which is disadvantageous in the manufacturing process of the anode active material.

The mixing time at the step (e) is the time until the 'additional pulverized pitch' is completely mixed with the 'first composite by pulverized natural graphite and pulverized pitch', which is the conglomerated first graphite composite, and may be determined depending on the amount used. A preferred mixing time is 1 hour or more.

The additional pitch of the step (e) is coated on the outside of the conglomerated first graphite composite prepared at the step (d), that is, the 'first composite by pulverized natural graphite and pulverized pitch'. Through first and second heat treatments performed thereafter, the final conglomeration graphite having a uniform particle size with graphite-crystallized is obtained.

In the method for producing conglomeration graphite according to the present invention, the 'additional mixing completion step' of the step (f) is a step of completing the mixing of the mixture by mixing the first composite by pulverized natural graphite and pulverized pitch, which is the conglomerated first graphite composite formed at the 'additional pitch adding and mixing-coating step' of the step (e), in a high-speed mixer such as the Mechanofusion. The high-speed mixer is operated at a speed of about 1,000 rpm to 3,000 rpm, and the mixing time may be determined depending on the mixing speed and the amount used, and is preferably 1 minute or more.

The additional mixing completion step of the step (f) is to ensure that the pitch is well coated on the outside of the conglomerated first graphite composite of the step (e). Through the step (f), the 'second composite in which the pitch is coated on the outside of the conglomerated first graphite composite', which is a 'second composite in which the pitch is coated on the outside of the first composite by pulverized natural graphite and pulverized pitch' is created.

In the method for producing conglomeration graphite according to the present invention, the 'first heat treatment step' of step (g) is a step of primarily heat-treating the 'second composite in which the pitch is coated on the outside of the conglomerated first graphite composite' of the step (f).

The heat treatment temperature is 1,000° ° C. or more, preferably 1,000° ° C. to 1,500° C. The heat treatment temperature is maintained for 30 minutes or more, preferably 1 hour or more. The first heat treatment of the step (g) is performed under a nitrogen atmosphere.

The first heat treatment of the step (g) is for carbonizing the pitch and/or the solvent used in the 'second composite in which the pitch is coated on the outside of the conglomerated graphite composite' to make it amorphous, and also improves the surface properties of the second composite of conglomerated graphite by removing external impurities from the second composite by additional coating of pitch.

Through the step (g), the 'primarily heat-treated conglomeration graphite' can be obtained.

In the method for producing conglomeration graphite according to the present invention, the 'second heat treatment step' of step (h) is a step of secondarily heat-treating the 'primarily heat-treated conglomeration graphite' of the step (g). The primarily heat-treated conglomeration graphite is cooled to room temperature and then subjected to a second heat treatment. The second heat treatment temperature is 2,000° C. or more. The second heat treatment is performed in an inert gas atmosphere such as argon gas, and the second heat treatment temperature is maintained for 30 minutes or more, preferably 1 hour or more.

The second heat treatment of the step (h) is a step of crystallizing amorphous carbon such as carbonized pitch and natural graphite of the primarily heat-treated conglomeration graphite formed by the first heat treatment of step (g). This step makes the crystallization of conglomeration graphite better. Excellent crystallization of the conglomeration graphite is advantageous in the manufacturing process of the anode active material.

The degree of crystallinity of the conglomeration graphite that has not passed through the step (h) is lowered (see the first comparative example), and the conglomeration graphite prepared accordingly has disadvantages of a lower initial efficiency due to an increased irreversible capacity during initial charge and discharge, and poor charge and discharge lifespan characteristics, so it is unfavorable for manufacturing an anode active material.

The above-described conglomeration graphite obtained by completing the second heat treatment of the step (h) can be used as an anode active material of a secondary battery, exhibiting excellent electrical characteristics in terms of initial discharge capacity, initial efficiency, and the like.

As described above, the method for producing conglomeration graphite of the present invention including the steps (a) to (h) is to produce conglomeration graphite by preparing a first composite of flaky pulverized natural graphite and pulverized pitch, preparing a second composite by coating pitch on the outside of the first composite (the steps (a) to (f)), primarily heating the second composite to amorphous the second composite (the step (g)), and secondarily heat-treating the amorphous second composite to crystallize it.

The conglomeration graphite prepared by the producing method of the present invention including the steps (a) to (h) has a crystalline carbon ratio exceeding 15% compared to natural graphite.

In addition, the conglomeration graphite prepared by the method for producing conglomeration graphite of the present invention including the steps (a) to (h) has an average particle size (D50) of 15 to 50 μm, preferably 15 to 30 μm. Further, the conglomeration graphite particles prepared by the producing method of the present invention have a uniform particle size with a specific surface area of 4.5 m²/g or less and have excellent crystallinity with d002 (nm, graphite interlayer distance) of 0.338 or less representing the crystallinity of the conglomeration graphite particles, thus exhibiting excellent initial discharge capacity (%) and initial efficiency (%) of a battery by maintaining the granularization of conglomeration graphite even under strong pressure applied during the manufacture of an anode active material.

Figure 1:
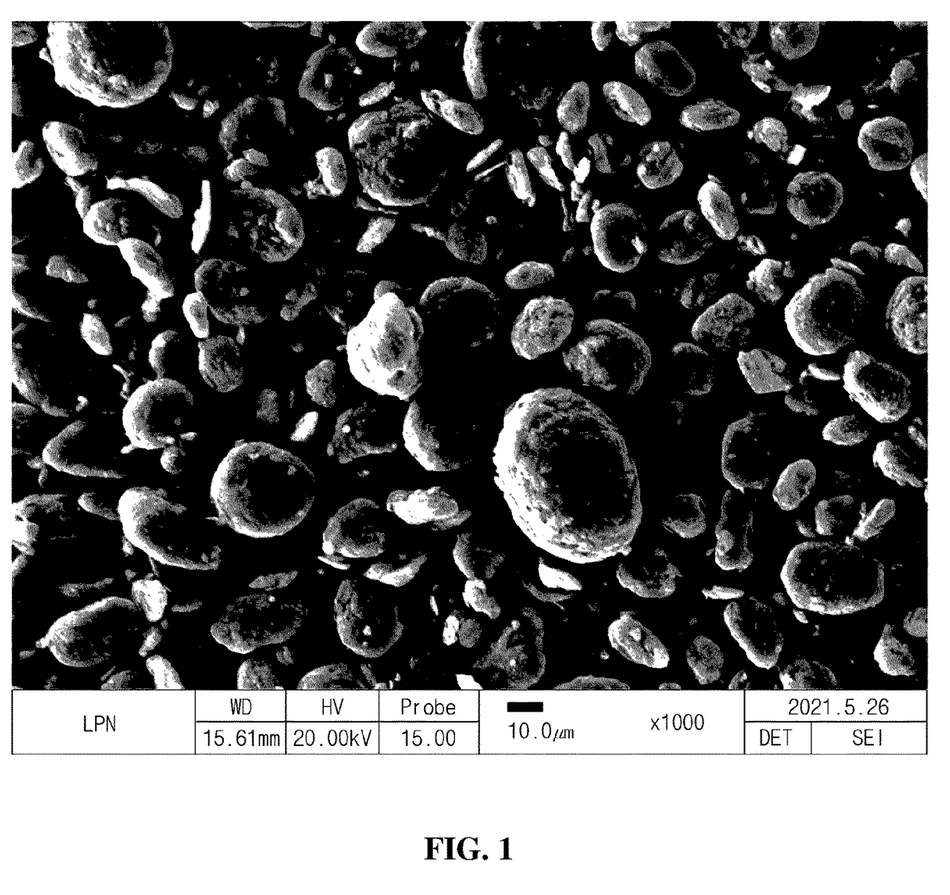
FIG. 1 is an SEM image showing aggregate of conglomeration graphite produced according to a first embodiment of a method for producing conglomeration graphite of the present invention.
Figure 2:
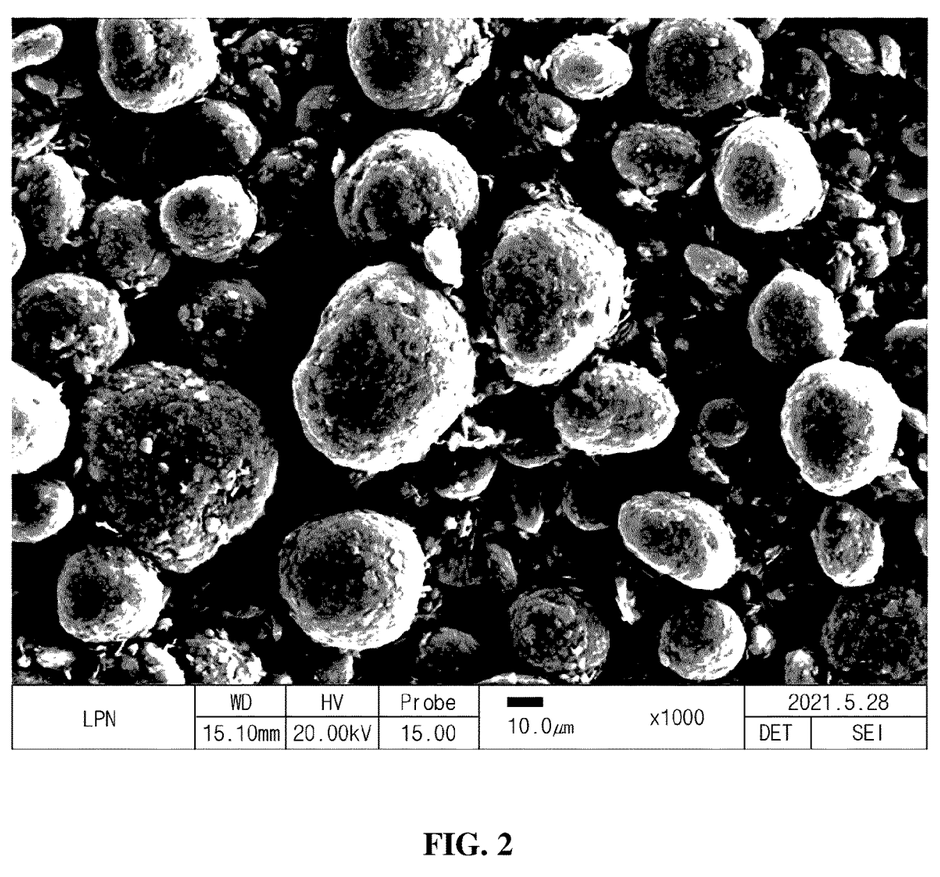
FIG. 2 is an SEM image showing aggregate of conglomeration graphite produced according to a second embodiment of the present invention.

The conglomeration graphite aggregate produced by the above-described method for producing the conglomeration graphite according to the present invention including the steps (a) to (h) is shown in the SEM image of FIGS. 1 and 2. As shown in the SEM images of FIGS. 1 and 2, the conglomeration graphite produced by the producing method according to the present invention has a spherical shape.

DESCRIPTION OF EMBODIMENTS

Hereinafter, the present invention will be further described through various embodiments. The following embodiments are intended to illustrate or specifically describe the present invention, and the scope of the present invention is not limited thereto.

In addition, since the contents not described herein can be sufficiently inferred by those skilled in the art, the description thereof will be omitted.

<Production of Conglomeration Graphite>

First Embodiment

Raw material of flaky natural graphite having an average particle size of 100 μm was pulverized to an average particle size of 3 μm using a jet mill set at a pulverization pressure of 7 bar to 9 bar to prepare pulverized natural graphite. In addition, pitch having an average particle size of 5 mm was pulverized using a jet mill set at a pulverization pressure of 6 bar to 8 bar to prepare pulverized pitch having an average particle size of 2 μm ('step (a)').

Then, 10 kg of the pulverized pitch and 90 kg of the pulverized natural graphite were put in a screw mixer and mixed for 1 hour ('step (b)'), and then 10 kg of kerosene and 10 kg of paraffin oil were added and further mixed for 1 hour ('step (c)'). Thereafter, 6 kg of the completely mixed product was put into a conglomerating machine, and a conglomeration process was performed at a linear speed of 4,500 m/min for 150 seconds ('step (d)').

After the conglomeration process was completed, 6 kg of the 'conglomerated graphite composite' was put into a screw mixer, 25 kg of pulverized additional pitch was added, and mixing was performed for 1 hour ('step (e)'). When the additional mixing of the 'conglomerated graphite composite' and the 'pulverized pitch' was completed, they were put into the Mechanofusion high-speed mixer and mixed again at 1,500 rpm for 10 minutes ('step (f)').

The remixed 'second composite in which the pitch is coated on the outside of the conglomerated graphite composite' was placed in an electric furnace and subjected to first heat treatment at 1,000° ° C. in a nitrogen atmosphere, and the time to maintain the heat treatment temperature at 1,000° C. was 1 hour ('step (g)'). The conglomerated graphite primarily heat-treated at 1,000° C. was cooled to room temperature, put into an electric furnace again, and subjected to second heat treatment at 2,400° ° C. in an argon gas atmosphere. The time to maintain the heat treatment temperature at 2,400° C. was 1 hour ('step (h)'), and finally conglomeration graphite was obtained.

For the conglomeration graphite finally prepared through the steps (a) to (h), an average particle diameter (D50, μm), a specific surface area (m²/g), and a graphite interlayer distance (d002, nm) through XRD analysis were measured. In addition, a coin cell half-cell using the conglomeration graphite as an anode active material was manufactured, and the initial discharge capacity (mAh/g) and initial efficiency (%) of the battery were measured (see Tables 1 and 2).

Second Embodiment

The final conglomeration graphite was prepared in the same manner as in the first embodiment, except for 'putting 15 kg of kerosene and 15 kg of paraffin oil as solvent at the step (c)' of the first embodiment.

The average particle diameter (D50, μm), specific surface area (m$^2$/g), and graphite interlayer distance (d002, nm) through XRD analysis of the prepared conglomeration graphite were measured. In addition, a coin cell half-cell using the conglomeration graphite as an anode active material was manufactured, and the initial discharge capacity (mAh/g) and initial efficiency (%) of the battery were measured (see Tables 1 and 2).

Third Embodiment

The final conglomeration graphite was prepared in the same manner as in the first embodiment, except for 'using 20 kg of pulverized pitch and 80 kg of pulverized natural graphite at the step (b)' and 'adding 15 kg of pulverized pitch at the step (e)' of the first embodiment.

The average particle diameter (D50, μm), specific surface area (m$^2$/g), and graphite interlayer distance (d002, nm) through XRD analysis of the prepared conglomeration graphite were measured. In addition, a coin cell half-cell using the conglomeration graphite as an anode active material was manufactured, and the initial discharge capacity (mAh/g) and initial efficiency (%) of the battery were measured (see Tables 1 and 2).

Fourth Embodiment

The final conglomeration graphite was prepared in the same manner as in the first embodiment, except that 'the conglomeration process was performed at a linear speed of 4,800 m/min for 150 seconds at the step (d)' of the first embodiment.

The average particle diameter (D50, μm), specific surface area (m$^2$/g), and graphite interlayer distance (d002, nm) through XRD analysis of the prepared conglomeration graphite were measured. In addition, a coin cell half-cell using the conglomeration graphite as an anode active material was manufactured, and the initial discharge capacity (mAh/g) and initial efficiency (%) of the battery were measured (see Tables 1 and 2).

Fifth Embodiment

The final conglomeration graphite was prepared in the same manner as in the first embodiment, except that 'the conglomeration process was performed at a linear speed of 4,500 m/min for 300 seconds at the step (d)' of the first embodiment.

The average particle diameter (D50, μm), specific surface area (m$^2$/g), and graphite interlayer distance (d002, nm) through XRD analysis of the prepared conglomeration graphite were measured. In addition, a coin cell half-cell using the conglomeration graphite as an anode active material was manufactured, and the initial discharge capacity (mAh/g) and initial efficiency (%) of the battery were measured (see Tables 1 and 2).

First Comparative Example

The final conglomeration graphite was prepared in the same manner as in the first embodiment, except that 'the second heat treatment', which is the step (h) of the first embodiment, was not performed.

The average particle diameter (D50, μm), specific surface area (m$^2$/g), and graphite interlayer distance (d002, nm) through XRD analysis of the prepared conglomeration graphite were measured. In addition, a coin cell half-cell using the conglomeration graphite as an anode active material was manufactured, and the initial discharge capacity (mAh/g) and initial efficiency (%) of the battery were measured (see Tables 1 and 2).

Second Comparative Example

The final conglomeration graphite was prepared in the same manner as in the first embodiment, except that 'the conglomeration process was performed at a linear speed of 4,000 m/min for 150 seconds at the step (d)' of the first embodiment.

The average particle diameter (D50, μm), specific surface area (m$^2$/g), and graphite interlayer distance (d002, nm) through XRD analysis of the prepared conglomeration graphite were measured. In addition, a coin cell half-cell using the conglomeration graphite as an anode active material was manufactured, and the initial discharge capacity (mAh/g) and initial efficiency (%) of the battery were measured (see Tables 1 and 2).

Third Comparative Example

The final conglomeration graphite was prepared in the same manner as in the first embodiment, except for 'adding 15 kg of pulverized pitch at the step (e)' of the first embodiment.

The average particle diameter (D50, μm), specific surface area (m$^2$/g), and graphite interlayer distance (d002, nm) through XRD analysis of the prepared conglomeration graphite were measured. In addition, a coin cell half-cell using the conglomeration graphite as an anode active material was manufactured, and the initial discharge capacity (mAh/g) and initial efficiency (%) of the battery were measured (see Tables 1 and 2).

Table 1 below shows the process conditions of the first to fifth embodiments and the first to third comparative examples. Table 2 below shows the particle size (D50, μm), specific surface area (m$^2$/g), and d002 (nm, graphite interlayer distance) of the conglomeration graphite prepared by the process conditions of Table 1.

For the average particle size, the particle size was measured using Anton Paar's Particle Size Analyzer, and the specific surface area was measured using Micromertics' BET device.

In addition, d002 of the graphite interlayer distance was measured as a stacking distance of each carbon hexagonal mesh face through XRD analysis, and the calculation is as follows.

d002=λ/2(sin θ), λ: wavelength value of Cu, the target of X-rays (1.5406 A)

θ: typical 002 in graphite is 26.554 2θ

<Manufacture of Coin Cell>

A slurry was prepared by mixing the conglomeration graphite anode active material:SBR:CMC in ultrapure water at a ratio of 98:1:1. The slurry was uniformly coated on copper foil, dried in an oven at 80° ° C. for about 2 hours, then roll-pressed, and further dried in a vacuum oven at 110° C. for about 12 hours to prepare an anode electrode plate.

Using the prepared anode electrode plate; a lithium foil as a counter electrode; a separator of porous polyethylene film;

and a liquid electrolyte in which $LiPF_6$ is dissolved at a concentration of 1.0 M in a solvent in which ethylene carbonate and diethyl carbonate (DEC) are mixed at a volume ratio of 3:7, a CR2032 coin type half-cell was prepared.

<Measurement of Initial Discharge Capacity and Efficiency of Coin Cell>

A constant current was applied until the battery voltage reached 0.01V (vs. Li) with a current of 0.1C rate at 25° C. When the battery voltage reached 0.01V, a constant voltage was applied for charging until the current reached a 0.01C rate. Discharging was made with a constant current of 0.1C rate until the voltage reached 1.5V (vs. Li).

Table 1 below shows the raw material input amount of graphite, pitch, and solvent, the conditions of the conglomeration process, the pitch input amount for the surface treatment process, and the heat treatment temperature in case of the first to fifth embodiments and the first to third comparative examples.

TABLE 1

|  | Raw material input amount (kg) | Conglomeration process | Pitch input amount for surface treatment process (kg) | Heat treatment temperature |
|---|---|---|---|---|
| 1st Embodiment | Graphite: 90 Pitch: 10 Solvent: 20 | Linear speed: 4,500 m/min Process time: 150 sec | Pitch 25 | 1000° C. → 2400° C. |
| 2nd Embodiment | Graphite: 90 Pitch: 10 Solvent: 30 | Linear speed: 4,500 m/min Process time: 150 sec | Pitch 25 | 1000° C. → 2400° C. |
| 3rd Embodiment | Graphite: 80 Pitch: 20 Solvent: 20 | Linear speed: 4,500 m/min Process time: 150 sec | Pitch 15 | 1000° C. → 2400° C. |
| 4th Embodiment | Graphite: 90 Pitch: 10 Solvent: 20 | Linear speed: 4,800 m/min Process time: 150 sec | Pitch 25 | 1000° C. → 2400° C. |
| 5th Embodiment | Graphite: 90 Pitch: 10 Solvent: 20 | Linear speed: 4,500 m/min Process time: 300 sec | Pitch 25 | 1000° C. → 2400° C. |
| 1st Comp. Ex. | Graphite: 90 Pitch: 10 Solvent: 20 | Linear speed: 4,500 m/min Process time: 150 sec | Pitch 25 | 1000° C. |
| 2nd Comp. Ex. | Graphite: 90 Pitch: 10 Solvent: 20 | Linear speed: 4,000 m/min Process time: 150 sec | Pitch 25 | 1000° C. → 2400° C. |
| 3rd Comp. Ex. | Graphite: 90 Pitch: 10 Solvent: 20 | Linear speed: 4,500 m/min Process time: 150 sec | Pitch 15 | 1000° C. → 2400° C. |

Table 1 shows conditions for each step of the first to fifth embodiments regarding the conglomeration graphite producing method including steps (a) to (h) of the present invention.

Specifically, in the first to fifth embodiments of the present invention, the content of pitch and surface treatment pitch in the total amount of graphite, pitch, and surface treatment pitch is 25% or more, while it is less than 25% in the third comparative example.

In the first comparative example, only the first heat treatment was performed and the second heat treatment was omitted. In the second comparative example, the linear speed was 4,000 m/min in the conglomeration process of step (d), which does not satisfy 4,500 m/min or more that is the linear speed condition of the present invention.

Table 2 below shows physical properties such as particle size (D50, μm), specific surface area (m²/g), and d002 (nm, graphite interlayer distance) of the conglomeration graphite prepared under the process conditions of Table 1 in the first to fifth embodiments and the first to third comparative examples, and initial discharge capacity (%) and initial efficiency (%) of a battery using the conglomeration graphite as an anode active material.

TABLE 2

| | Conglomeration graphite | | | | |
|---|---|---|---|---|---|
| | Particle size (D50, μm) | Specific surface area (m²/g) | d002 (nm) | Initial discharge capacity (%) | Initial efficiency (%) |
| 1st Embodiment | 16.1 | 3.4 | 0.338 | 352.8 | 92.8 |
| 2nd Embodiment | 25.6 | 3.1 | 0.338 | 349.4 | 91.6 |
| 3rd Embodiment | 14.8 | 4.2 | 0.338 | 344.7 | 91.7 |
| 4th Embodiment | 19.8 | 3.3 | 0.338 | 350.2 | 92.6 |
| 5th Embodiment | 20.4 | 3.3 | 0.338 | 346.1 | 92.4 |
| 1st Comp. Ex. | 16.5 | 3.8 | 0.341 | 348.5 | 86.9 |
| 2nd Comp. Ex. | 12.1 | 5.5 | 0.338 | 345.4 | 90.6 |
| 3rd Comp. Ex. | 17.3 | 5.9 | 0.339 | 330.4 | 88.5 |

From Table 2, it can be seen that the first to fifth embodiments regarding the conglomeration graphite producing method of the present invention have similar or higher initial discharge capacity and excellent initial efficiency compared to the first to third comparative examples. This high initial efficiency has the advantage of being able to design a high-capacity cell by reducing the consumption of lithium ions provided by the cathode during initial charging.

In addition, unlike the first to fifth embodiments in Table 2, the first to third comparative examples exhibit the following disadvantages.

First, the conglomeration graphite of the first comparative example in which only the first heat treatment was performed has a d002 value of 0.341 nm, which indicates crystallization, and is larger than the conglomeration graphite of the first to fifth embodiments and the second and third comparative examples in which the first heat treatment and the second heat treatment were performed. This means that the degree of crystallization of graphite is low. Thus, in the case of manufacturing a battery using the conglomeration graphite of the first comparative example as an anode active material, irreversible capacity increases during initial charge and discharge, resulting in low initial efficiency and poor charge and discharge life characteristics.

Next, in the second comparative example, the conglomeration linear speed of pulverized graphite and pulverized pitch is 4,000 m/min, which is lower than 4,500 m/min or more in the first to fifth embodiments. Thus, as the degree of conglomeration decreases, the form of conglomeration graphite, which is an anode active material, is broken by pressurization in the manufacturing process, and the efficiency of the anode active material is lowered, resulting in a deterioration in the initial efficiency of the battery.

Figure 3:
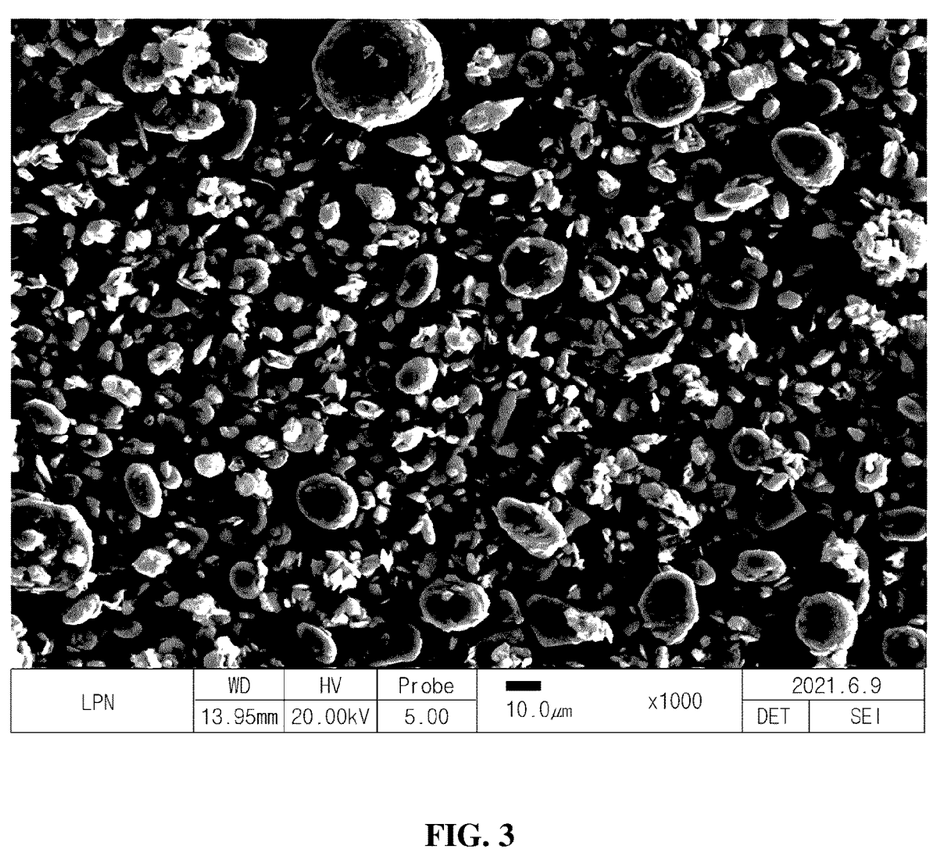
FIG. 3 is an SEM image showing aggregate of conglomeration graphite produced according to a second comparative example of the present invention.

Also, in the third comparative example, the amount of pitch used in the conglomeration graphite is 25% or less, which is small compared to more than 25% in the first to fifth embodiments. Due to such a small amount of pitch, the role of the binder forming the conglomeration of pulverized graphite is reduced, and the specific surface area of the finally produced conglomeration graphite is increased. Thus, the state of the conglomeration graphite is powdered (see FIG. 3 of the second comparative example, which has a similar specific surface area to the third comparative example), and when used as an anode active material, the efficiency of the anode active material is lowered, resulting in a decrease in the initial efficiency of the battery.

INDUSTRIAL APPLICABILITY

As described above, the novel conglomeration graphite produced by the method according to the first to fifth embodiments of the present invention shows excellent initial efficiency and initial discharge capacity when used as an anode active material of a battery, so that it can be used as an excellent anode active material of a battery and therefore is potential for industrial use.

The invention claimed is:

1. A method for producing conglomeration graphite, comprising steps of:
   (a) pulverizing flaky natural graphite and pitch, respectively ('natural graphite and pitch pulverization step');
   (b) mixing the natural graphite and the pitch respectively pulverized at the step (a) ('natural graphite and pitch mixing step');
   (c) further mixing a mixture of the step (b) with a solvent ('solvent mixing step');
   (d) preparing a conglomerated first graphite composite by conglomerating the mixture of the step (c) ('conglomeration step');
   (e) adding and mixing-coating additional pitch to the first graphite composite in which conglomeration of the step (d) is completed ('additional pitch adding and mixing-coating step');
   (f) preparing a second composite in which the additional pitch is coated on an outside of the conglomerated first graphite composite by completing additional mixing of the mixture of the step (e) ('additional mixing completion step');
   (g) performing a first heat treatment on the second composite of the step (f) ('first heat treatment step'); and
   (h) after the first heat treatment of the step (g), cooling to room temperature and then performing a second heat treatment,
   wherein at the step (e), an amount of the additional pulverized pitch is determined such that the sum of the pulverized pitch of the step (a) and the additional pulverized pitch of the step (e) exceeds 25% by weight out of the total weight part of the sum of the pulverized natural graphite and pulverized pitch of the step (a) and the additional pulverized pitch,
   wherein at the step (g), the first heat treatment is performed under heat treatment conditions of 1,000° C. or more for 30 minutes or more, and
   wherein at the step (h), the second heat treatment is performed under heat treatment conditions of 2,000° C. or more for 30 minutes or more.

2. The method of claim 1, wherein the 'flaky natural graphite' of the step (a) has an average particle diameter of 5 to 500 μm, the pulverization of natural graphite is performed using a high-speed mechanical milling machine under a pressure of 5 bar to 10 bar, and the pulverized natural graphite particles have an average particle diameter of 1 μm to 10 μm.

3. The method of claim 1, wherein at the step (a), the pulverization of pitch is performed using a high-speed mechanical milling machine under a pressure of 5 bar to 10 bar, and the pulverized pitch has an average particle diameter of 0.5 μm to 10 μm.

4. The method of claim 1, wherein at the step (b), a mixing weight % ratio between the pulverized natural graphite and the pulverized pitch is 99:1 to 50:50.

5. The method of claim 1, wherein at the step (c), the solvent is one or more selected from the group consisting of mineral oil such as kerosene, heavy oil, light oil, and paraffin oil; hydrocarbon solvent such as toluene and decane; and mixtures thereof.

6. The method of claim 1, wherein at the step (c), an amount of the solvent used is 10 to 50 parts by weight based on 100 parts by weight of 'mixture of the pulverized natural graphite and the pulverized pitch'.

7. The method of claim 1, wherein the conglomeration of the step (d) is performed at a rotational force of more than 4,000 m/min up to 8,000 m/min for an operating time of 100 seconds to 600 seconds.

8. The method of claim 1, wherein at the step (f), the additional mixing is mixing the conglomerated first graphite composite formed at the step (e) in a high-speed mixer at a speed of 1,000 rpm to 3,000 rpm for 1 minute or more.

9. A conglomeration graphite produced according to claim 1, wherein the conglomeration graphite produced using natural graphite and pitch of amorphous carbon and having a crystalline carbon ratio exceeding 15% compared to the natural graphite.

10. A conglomeration graphite produced according to claim 1, wherein the conglomeration graphite having a specific surface area of 4.5 m$^2$/g or less and having d002 (nm, graphite interlayer distance) of 0.338 or less representing crystallinity of graphite particle.

11. A secondary battery using the conglomeration graphite of claim 9 as an anode active material.

12. A secondary battery using the conglomeration graphite of claim 10 as an anode active material.

13. A conglomeration graphite produced according to claim 2, wherein the conglomeration graphite produced using natural graphite and pitch of amorphous carbon and having a crystalline carbon ratio exceeding 15% compared to the natural graphite.

14. A conglomeration graphite produced according to claim 3, wherein the conglomeration graphite produced using natural graphite and pitch of amorphous carbon and having a crystalline carbon ratio exceeding 15% compared to the natural graphite.

15. A conglomeration graphite produced according to claim 4, wherein the conglomeration graphite produced using natural graphite and pitch of amorphous carbon and having a crystalline carbon ratio exceeding 15% compared to the natural graphite.

16. A conglomeration graphite produced according to claim 5, wherein the conglomeration graphite produced using natural graphite and pitch of amorphous carbon and having a crystalline carbon ratio exceeding 15% compared to the natural graphite.

17. A conglomeration graphite produced according to claim 2, wherein the conglomeration graphite having a specific surface area of 4.5 m$^2$/g or less and having d002 (nm, graphite interlayer distance) of 0.338 or less representing crystallinity of graphite particle.

18. A conglomeration graphite produced according to claim 3, wherein the conglomeration graphite having a specific surface area of 4.5 m$^2$/g or less and having d002 (nm, graphite interlayer distance) of 0.338 or less representing crystallinity of graphite particle.

19. A conglomeration graphite produced according to claim 4, wherein the conglomeration graphite having a specific surface area of 4.5 m²/g or less and having d002 (nm, graphite interlayer distance) of 0.338 or less representing crystallinity of graphite particle.

20. A conglomeration graphite produced according to claim 5, wherein the conglomeration graphite having a specific surface area of 4.5 m²/g or less and having d002 (nm, graphite interlayer distance) of 0.338 or less representing crystallinity of graphite particle.

\* \* \* \* \*